United States Patent [19]
Gorissen

[11] 3,960,251
[45] June 1, 1976

[54] HYDRAULIC TELESCOPIC SHOCK ABSORBER PROVIDING A DAMPING EFFECT WHICH IS DEPENDENT UPON THE POSITION OF THE PISTON IN THE CYLINDER

[75] Inventor: Adrianus Marinus Johannes Gorissen, Oud-Beijerland, Netherlands

[73] Assignee: ITT Industries, Inc., New York, N.Y.

[22] Filed: July 31, 1975

[21] Appl. No.: 600,287

Related U.S. Application Data

[63] Continuation of Ser. No. 497,889, Aug. 16, 1974, abandoned.

[30] Foreign Application Priority Data

Aug. 20, 1973 Netherlands .................. 7311434

[52] U.S. Cl. .................. 188/286; 188/318
[51] Int. Cl.² .................. F16F 9/48
[58] Field of Search .......... 188/282, 284, 285, 286, 188/318

[56] References Cited
UNITED STATES PATENTS

| 1,492,731 | 5/1924 | Kerr | 188/318 |
| 2,055,365 | 9/1936 | Rossman | 188/318 X |
| 3,722,640 | 3/1973 | Taylor | 188/316 |

FOREIGN PATENTS OR APPLICATIONS

| 1,110,201 | 10/1955 | France | 188/318 |
| 112,546 | 1/1918 | United Kingdom | 188/318 |
| 1,239,667 | 7/1971 | United Kingdom | 188/318 |

Primary Examiner—George E. A. Halvosa
Attorney, Agent, or Firm—J. B. Raden; D. P. Warner

[57] ABSTRACT

A shock absorber is provided for automotive vehicles in which the damping force is dependent upon the position of the piston in a cylinder and therefore dependent upon the load. The damping forces in both directions of movement of the piston in a cylinder are higher in a more compressed portion than in a more expanded position of the shock absorber. The damping action for different portions of the stroke can be adjusted readily from the outside and independently for both directions of movement.

6 Claims, 4 Drawing Figures

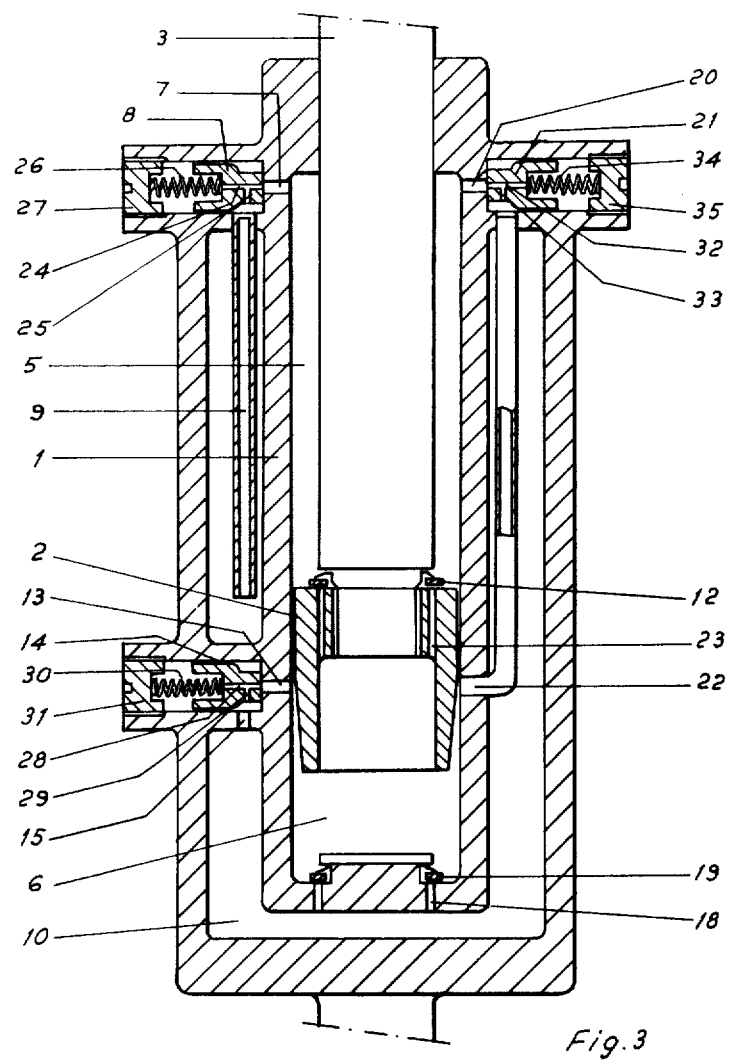
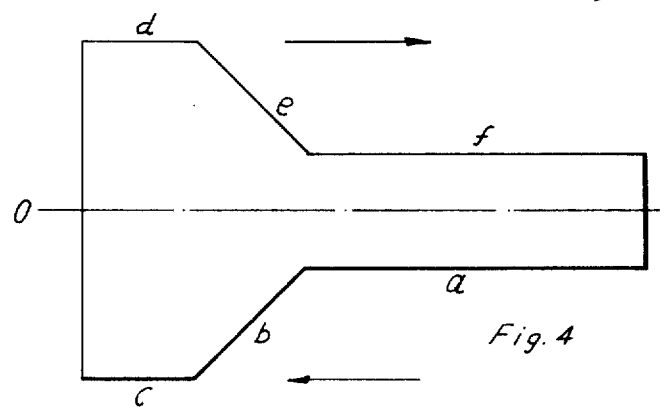

HYDRAULIC TELESCOPIC SHOCK ABSORBER PROVIDING A DAMPING EFFECT WHICH IS DEPENDENT UPON THE POSITION OF THE PISTON IN THE CYLINDER

This is a continuation of application Ser. No. 497,889 filed Aug. 16, 1974, now abandoned.

BACKGROUND OF THE INVENTION

1. Field of the Invention

The invention relates to a hydraulic telescopic shock absorber having a cylinder in which a piston is movable by a piston rod extending through the cylinder cap, which piston divides the cylinder into two chambers. It relates further to such a shock absorber having a system of passages for the damping fluid by which the two cylinder chambers communicate with each other and with a damping fluid reservoir arranged outside of the cylinder, in which a plurality of said passages comprise resistance members for effecting a damping force during the stroke of the piston, and in which during a complete ingoing stroke as well as during a complete outgoing stroke of the piston at least one communication of the passages with the cylinder is closed by the piston.

2. Description of the Prior Art

Such shock absorbers can be used for damping the vertical movements which a vehicle body undergoes relative to the supporting wheel construction due to the springy suspension of said parts. When the vehicle is loaded more heavily the springs will be compressed so that the shock absorbers normally take a more contracted position. In order to have the damping of the motions of the vehicle body to be as good as possible in the whole range of loads of the vehicle, the damping force of the shock absorbers should be higher at a higher loading of the vehicle than at a lower loading. In other words, the damping force in both directions of movement should be higher in a more contracted position of the shock absorber than in a more expanded position.

Although shock absorbers in which the damping force is dependent on the position of the piston in the cylinder are already known, no such shock absorbers have been provided hitherto in which the damping forces in both directions of movement are higher in a more compressed position than in a more expanded position and in which the damping forces, which act during different portions of the stroke and in both directions can be adjusted readily from the outside.

SUMMARY OF THE INVENTION

It is therefore an object of the present invention to provide means in a shock absorber, to cause the damping forces in both directions of movement to be higher in a more compressed position than in a more expanded position and in which the damping forces, which act during different portions of the stroke and in both directions can be adjusted readily from the outside.

The shock absorber of the present invention is characterized in that during the complete ingoing as well as during the complete outgoing stroke at least two resistance means operate successively, that during the last portion of the ingoing stroke the means having the lowest resistance that is effective during said stroke, is put out of action by the piston and that during the first portion of the outgoing stroke the means having the lowest resistance that is effective during said stroke, is kept out of action by the piston.

In order to reduce the number of resistance means in a unidirectional shock absorber in which during the ingoing stroke the damping is effective by the penetrating piston rod volume and during the outgoing stroke by the damping fluid volume which is displaced by the annular surface of the piston, the resistance means operating at the ingoing and the resistace means operating at the beginning of the outgoing stroke can be combined to form a single resistance means. The shock absorber according to the invention is further characterized in that the resistance means operating during the last portion of the ingoing stroke and the resistance means operating over the first portion of the outgoing stroke are combined to form a single resistance means.

In order to be able to equalize the damping forces in any position of the piston both during the ingoing and during the outgoing stroke and moreover to have them vary linearly at different piston speeds, the resistance means in the shock absorber can be designed such that they comprise equally shaped valve assemblies each comprising a valve which is urged onto its seat by an adjustable spring and a free passage of reduced section in parallel to said valve.

Because a valve shows a degressive resistance response and a free passage shows a progressive one, a nearly linear resistance response can be provided by combining both said resistance means. Accordingly, the shock absorber according to the invention is characterized in that the resistance means comprise valve assemblies each comprising a valve which is urged onto its seat by a spring and a free passage of reduced section in parallel to said valve.

The transition between the different acting damping forces during both the ingoing and the outgoing stroke can be made to proceed gradually by shaping a portion of the periphery of the piston remote from the piston rod to be truncated conically. So, according to a further characteristic of the invention a portion of the periphery of the piston remote from the piston rod is shaped truncated conically.

BRIEF DESCRIPTION OF THE DRAWINGS

The above-mentioned and other objects and features of the invention will become more apparent and the invention itself will be best understood by referring to the following description of embodiments taken in conjunction with the accompanying drawings in which:

FIG. 3 is a longitudinal cross-section of the shock absorber according to the present invention in which the passages and the valve assemblies are shown in more detail and FIG. 4 shows the damping forces as a function of the position of the piston in the cylinder provided by the shock absorber according to the present invention.

DESCRIPTION OF A PREFERRED EMBODIMENT

Figure 1:
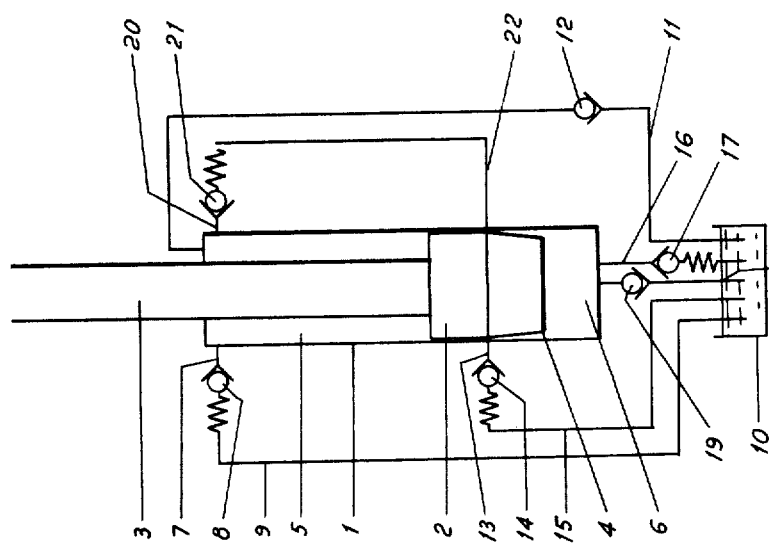
FIG. 1 is a schematic cross-sectional view of a shock absorber according to the present invention.

Referring to FIG. 1, the hydraulic telescopic shock absorber 1 has therein a piston 2 movable by piston rod 3.

The piston 2 divides cylinder 1 into a chamber 5 adjacent the rod side and the chamber 6 adjacent the bottom side. Cylinder chamber 5 communicates with damping fluid reservoir 10 arranged outside of the cylinder through passage 7 comprising a throttle valve 8 and conduit 9, the reservoir moreover communicating with the cylinder chamber 5 through conduit 11 in which the non-return valve 12 is arranged. Cylinder chamber 6 communicates with reservoir 10 on the one hand through passage 13 with a throttle valve 14 and conduit 15 and on the other hand through passage 16 having a throttle valve 17, the piston shutting passage 13 throughout the last portion of the ingoing stroke of the piston.

The reservoir also communicates with cylinder chamber 6 through conduit 18 in which non-return valve 19 is arranged.

The cylinder chamber 5 moreover couples to a passage 20, which communicates through throttle valve 21 with passage 22, which discharges into cylinder chamber 6 and is shut by the piston throughout the last portion of its ingoing stroke.

The operation of the shock absorber is as follows.

During the ingoing movement of the piston 2, starting from the expanded position of the shock absorber to the position shown, damping fluid is forced out of the cylinder chamber 6 through the passage 13 and through throttle valve 14 and conduit 15.

Simultaneously the same amount of medium pressure which causes valve 14 to open, is exerted on the throttle valve 17 through passage 16. The latter, however, is adjusted more heavily than the valve 14 and will only open after the piston has shut the passage 13 when the piston has penetrated in the cylinder beyond the position shown.

During the whole of the ingoing stroke of the piston, damping medium out of reservoir 10 is replenished in the cylinder chamber 5 through conduit 11 and non-return valve 12.

In the course of the outgoing stroke of the piston, starting from the compressed position of the shock absorber to the position shown, damping fluid is forced out of the cylinder chamber 5 through passage 7 passing the throttle valve 8 to the reservoir 10.

Simultaneously an equal amount of fluid pressure is exerted on throttle valve 21 through passage 20. Although this valve is adjusted so as to open with a lower pressure than valve 8, said valve 21 will not allow fluid to pass as long as the port of passage 22 remains shut by the piston. Only after the piston has withdrawn beyond the position shown and the piston unlocks said port, will pressure fluid be allowed to pass out of cylinder chamber 5 through throttle valve 21 to cylinder chamber 6. The shortage of damping fluid in cylinder chamber 6 caused by the retracting piston rod volume will be replenished from the reservoir 10 through conduit 18 and non-return valve 19.

The arrangement according to the invention provides a shock absorber having the features aimed at, in that damping forces in both directions of travel are higher in a more compressed position than in a more expanded position. A typical damping force graph is shown in FIG. 4 in which the position of the stroke is graphically shown along the abscissa and the corresponding damping force of the shock absorber is shown vertically. The piston speed in both directions of travel is assumed to be constant while the damping forces during the ingoing stroke are shown below the zero line and during the outgoing stroke above the zero line, respectively.

Portion $a$ represents the damping force which is effective during the first part of the ingoing stroke and is caused by the resistance of throttle valve 14.

As soon as the truncated conical peripheral portion 4 of the piston 2 gradually shuts port 13, the damping force will raise as indicated in FIG. 4 by line portion $b$.

As soon as port 13 has been shut completely, the damping force is determined by the throttle valve 17 (FIG. 1), which is adjusted more heavily, line $c$ in FIG. 4 relating to this part of the stroke.

During the outgoing stroke the damping force will be determined initially by the resistance of throttle valve 8 (FIG. 4 line $d$). Due to the truncated conical shape of the piston 4, port 22 is gradually opened (FIG. 4 line $e$) and after that the damping force is solely determined by throttle valve 21, which is adjusted more lightly, as indicated in FIG. 4 by line $f$.

Figure 2:
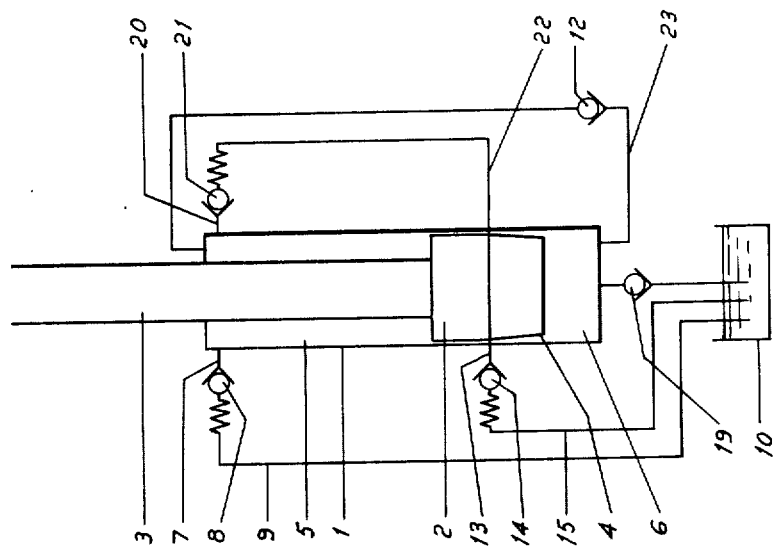
FIG. 2 is a schematic cross-sectional view of the shock absorber according to FIG. 1 embodying a further feature of the present invention.

FIG. 2 shows an embodiment in which one of the four throttle valves can be dispensed with entirely. In this Figure throttle valve 17 is omitted and conduit 11 is replaced by conduit 23 while throttle valve 12 is now in communication with the cylinder chamber 6. The sole restriction inherent to this embodiment is that the damping forces over the first portion of the ingoing stroke and the last portion of the outgoing stroke, corresponding to the lines $a$ and $f$ in FIG. 4 respectively, can no longer be adjusted independent from each other because they are now, as will be shown hereunder, controlled by the same throttle valve 21. A predetermined relationship between these damping forces in this portion of the stroke can be chosen by properly dimensioning the penetrating surfaces (determined by the cross sections of the piston and the piston rod) during the ingoing and outgoing stroke respectively.

In the embodiment of FIG. 2, damping medium is forced out of cylinder chamber 6 through conduit 23 and throttle valve 12 into cylinder chamber 5, during the whole of the ingoing stroke. Surplus of damping fluid caused by the penetrating piston rod volume will flow through passage 13 and throttle valve 14 and after the piston has shut passage 13, through passage 23 and throttle valve 12 into chamber 5. During the outgoing stroke of the piston, the operation is the same as described relative to FIG. 1.

FIG. 3 shows a detailed sectional view of the shock absorber according to FIG. 2.

The conduit 23 and the non-return valve 12 of FIG. 2 are arranged within the piston 2 in FIG. 3, while non-return valve 19 together with conduit 18 are arranged in the bottom of cylinder 1. Reservoir 10 is arranged concentrically around cylinder 1.

The operation of the shock absorber shown in FIG. 3 corresponds with that shown schematically in FIG. 2.

In order to have the relationship between the damping force and the speed of travel as linear as possible each throttle member comprises a parallel arrangement of a spring loaded valve and a passage having a reduced cross section. Accordingly, the valve 8 has bores 24 and 25 having reduced cross section through which passage 7 by means of conduit 9 directly communicates with reservoir 10, valve 8 being urged onto its seat by spring 26, the bias of which is adjustable from the outside of the shock absorber by means of plug 27. Similarly valve 21 has bores 32 and 33 having reduced cross section, by which passage 20 directly communicates with passage 22 and in which valve 21 is urged onto its seat by spring 34, the bias of which is adjustable from the outside of the shock absorber by means of plug 35.

FIG. 3 clearly shows that the three throttle means are identical and interchangeable which is cost saving.

It goes without saying that by differently dimensioning proportions between penetrating surfaces, the adjustment of valves 8, 14, 17 and 21, the position of passages 13 and 22, the length of the cylindrical portion of the piston 2, the taper and the length of the peripherical portion 4 of piston 2, any required diagram can be provided, condition being maintained that the damping in the contracted state is higher than the damping in the expanded state.

If a symmetrical diagram is required showing symmetry relative to the zero line for the damping forces during the ingoing and outgoing stroke with shock absorbers according to FIGS. 2 and 3, the ratio between penetrating surfaces during the ingoing and outgoing stroke should be 1:1 and valves 14 and 21 should be adjusted to equally throttle.

While the principles of the invention have been described above in connection with specific apparatus and applications, it is to be understood that this description is made only by way of example and not as a limitation on the scope of the invention.

What is claimed is:

1. A hydraulic telescopic shock absorber comprising a cylinder, a piston positioned to move within said cylinder, a piston rod extending through one end of the cylinder to engage said piston, the piston dividing the cylinder into two chambers, a plurality of passages through the walls of the cylinder, conduits coupled to a plurality of the passages to permit the flow of dampening fluid between the cylinder chambers, conduits coupled to a plurality of the passages to permit the flow of dampening fluid between the cylinder chambers and a dampening fluid reservoir, valve means in said conduits for effecting dampening forces during strokes of the piston, the passages being positioned in such a way that during at least a portion of an in-going stroke as well as during at least a portion of an out-going stroke of the piston at least one communication of the passages with the cylinder is closed by the piston to increase the dampening effect of the shock absorber, and including an arrangement such that during a complete in-going stroke as well as during a complete out-going stroke at least two valve means operate successively, that during the last portion of the in-going stroke valve means having the lowest resistance that is effective during said stroke is put out of action by the piston while valve means having a higher resistance is put into action and that during the first portion of the out-going stroke valve means having the lowest resistance that is effective during said stroke is kept out of action by the piston while valve means having the higher resistance is kept in action.

2. A shock absorber according to claim 1, in which the valve means operating during the last portion of the ingoing stroke and the valve means operating over the first portion of the outgoing stroke are combined to form a single valve means.

3. A shock absorber according to claim 1, in which the valve means include identical valve assemblies, each assembly including a valve which is urged onto a valve seat by a spring and a free passage of reduced section in parallel to said valve.

4. A shock absorber according to claim 3, in which the valves include adjustment means including a spring and a plug which may be adjusted to vary the bias on the spring.

5. A shock absorber according to claim 1, in which all valve means are of equal design and equal dimensions.

6. A shock absorber according to claim 1, in which a portion of the periphery of the piston remote from the piston rod is shaped as a truncated cone.

* * * * *